2,780,856
METAL CUTTING TOOL

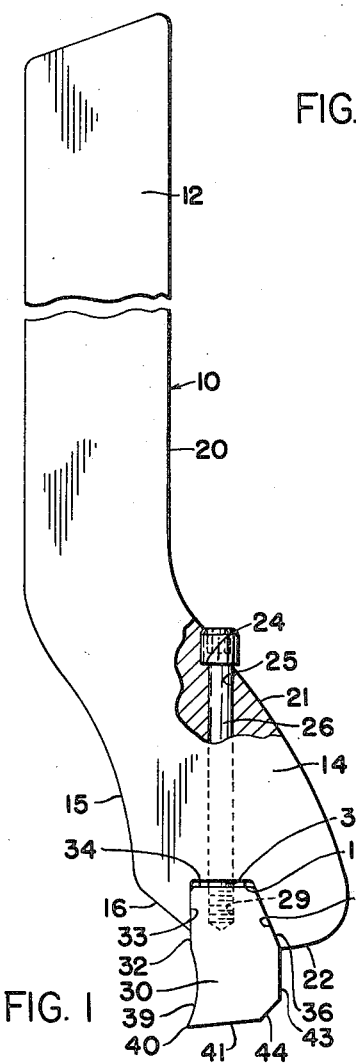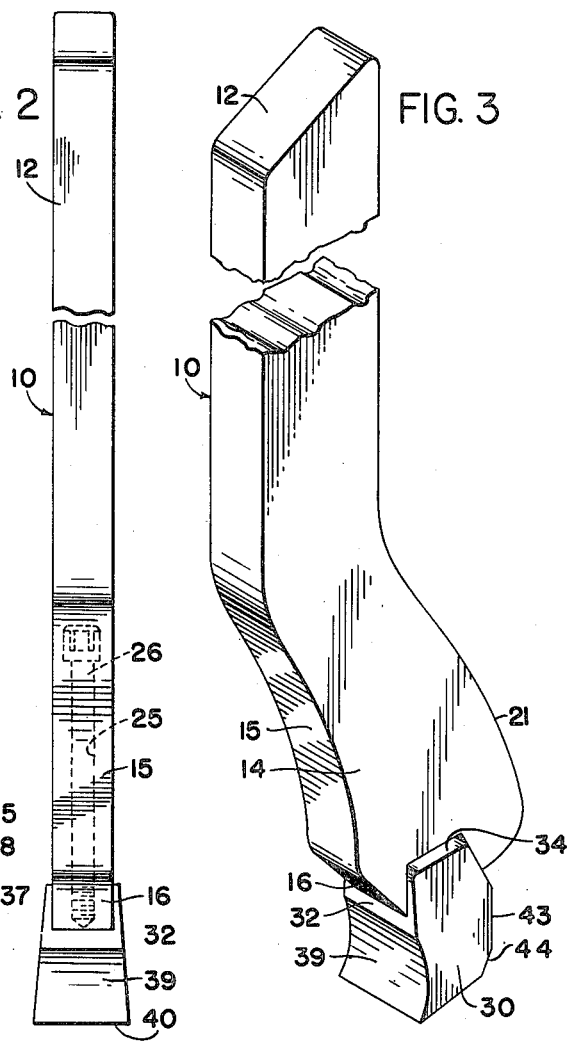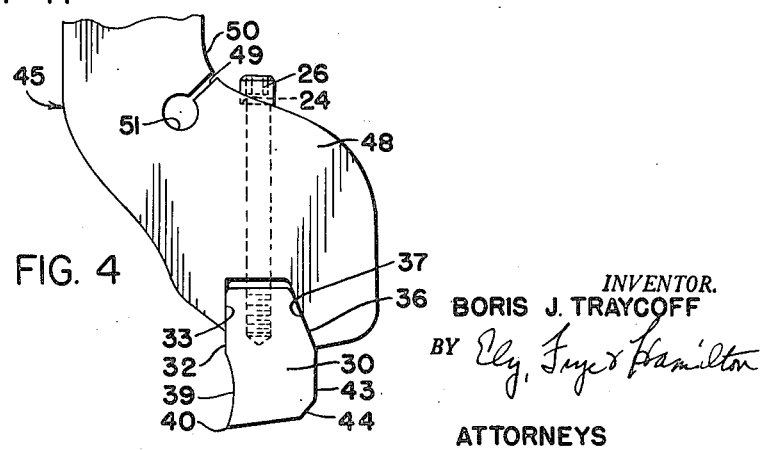
INVENTOR.
BORIS J. TRAYCOFF
BY Ely, Frye & Hamilton
ATTORNEYS

Boris J. Traycoff, Kent, Ohio

Application November 1, 1954, Serial No. 466,017

1 Claim. (Cl. 29—96)

The present invention relates to an improved metal cutting tool, comprising a novel tool holder and a replaceable tool bit insert, suitable for use with a planer, shaper, lathe, vertical boring mill and other analogous machine tools.

The metal cutting tool which I have invented embodies certain novel and highly desirable features, and will readily and economically perform many machining operations which presently can be performed only by conventional tools of a costly and complicated construction. For example, the machining art has long sought a cutting tool which would cut a slot deeper than the length, from holder to cutting edge, of the tool bit being used. Using conventional tools, this has been difficult to achieve because the conventional tools cannot use a tool bit insert which is wider than the shank of the tool holder, nor may the point of the tool be extended any substantial distance from the tool holder because of the likelihood of tool "chatter."

Conventional tools are also generally unsatisfactory for form cutting on a radius because of the twisting of the tool bit within the tool holder when subjected to torsional pressure, in addition to cutting thrust. Further, it is well known that a serious difficulty encountered with work on a shaper is that the cutting tool has a tendency to spring to one side, or deviate from a vertical. This tendency to spring to one side is presently being overcome by using one tool to rough cut and a second tool for the finish cut.

Another disadvantage of conventional cutting tools is their tendency to chatter. This difficulty may be caused by the work being improperly supported or by too much play in the tool itself. It is also well known that providing the cutting tool with too much clearance or suspending the tool too far from the work will cause chatter.

Accordingly, it is a general object of my invention to provide an improved cutting tool and holder which will overcome the disadvantages of prior constructions. A specific object of my invention is to provide an improved cutting tool, suitable for use in a planer, shaper, lathe, vertical boring mill or other analogous machine tools, which will cut a slot of a depth greater than the length, from holder to cutting edge, of the improved tool being used.

Another object is to provide a tool holder which will hold a tool bit in fixed position despite severe cutting thrust and torsional pressure.

Still further, it is an object to provide a tool holder which will hold a tool bit without requiring excessive clearance, and which does not suspend the tool too far from the work, thus serving to lessen the likelihood of tool "chatter."

These and other objects will be apparent in view of the following detailed description of two embodiments of my invention, taken in conjunction with the attached drawings.

In the drawings:

Fig. 1 is a plan elevation, partly broken away, showing one embodiment of the improved tool holder;

Fig. 2 is a front elevation of the tool shown in Fig. 1;

Fig. 3 is an isometric view, partly broken, of the tool shown in Fig. 1, and

Fig. 4 is a partial plan elevation, showing an alternative embodiment of the improved tool holder.

In general, the improved cutting tools according to my invention are preferably of carbon steel, heat treated to obtain suitable characteristics and comprise an upper shank portion adapted to be held by the ram or tool head of a machine tool, a lower shank portion offset rearwardly of the upper portion, a tool bit insert notch of novel construction on the under surface of the lower shank, and a tool bit conforming with the insert notch and held therein by suitable means extending through the lower shank.

The construction of the insert notch is such that regardless of the amount of torsional force or pressure, the tool bit will remain tightly held in the insert notch. Further, the front surface of the insert notch is located behind the trailing edge of the upper shank portion so that the thrust against the cutting edge of a tool bit inserted in the notch is transmitted toward the front of the tool holder and the upper shank portion, thereby greatly lessening the possibility of tool "chatter."

Referring to the drawings, the embodiment of my invention shown in Figs. 1–3, is a heavy-duty type tool primarily intended for planer work, and is indicated generally by the numeral 10. The straight upper shank portion 12 is mounted in a tool head of a planer (not shown). Offset rearwardly of the upper shank is the lower shank 14. The front surface 15 of the lower shank is preferably rearwardly concaved and merges with a straight rearwardly sloped surface 16 which terminates at the tool bit insert notch indicated generally by the numeral 18.

Below the trailing edge 20 of the upper shank 12, the rear surface 21 of the lower shank descends rearwardly in a downward convex arc, the lower end of which curves forward to join the substantially horizontal surface 22 on the underside of the lower shank. It will be understood that surfaces 15 and 21 may have a configuration other than the gradual arcs shown, without departing from the scope of the invention.

At a point on surface 21, located substantially vertically above the tool insert notch 18 is a recessed area 24 which has opening downward therefrom, and communicating with the insert notch, a bore 25 through which is passed a bolt 26, or other suitable means, to fasten into a tapped hole 29 in the tool bit 30. The bolt 26 serves to hold the tool bit 30 within the insert notch 18 when the cutting tool is assembled for use, and also strengthens the assembled tool to counteract the effect of the cutting thrust.

The tool bit 30 has a substantially vertical front surface 32 which is in conformity with the front surface 33 of the insert notch 18. The top surface 34 of the tool bit has a tapped hole 29, as described above, to receive the bolt 26 depending from bore 25, the bottom end of which opens into top surface 35 of the insert notch. The rear surface 36 of the tool bit is rearwardly sloped and is in conformity with the flat, sloped surface 37 of the insert notch which continues downward and rearwardly until it joins the bottom surface 22.

Below the front surface 32, the tool bit preferably has a rearwardly concave surface 39 which terminates in a cutting edge 40. From the cutting edge, the under surface 41 of the tool bit is sloped upward to provide the desired clearance angle. Where the under surface approaches the lower rear surface 43 of the tool bit, the tool bit may be provided with a beveled surface 44, if desired for proper tool clearance and ease in chip removal.

Referring to Fig. 4, the embodiment of the invention shown herein is a light duty tool intended for use in shapers and planers and is indicated generally by the numeral 45. The lower shank portion 48 is similar to the lower shank portion 14 of tool 10, except that a cut-out slot 49 is provided above the area 24, in the curved surface 50 connecting the trailing edge of the upper shank with the rear surface of the lower shank 48. The cut-out slot 49 opens into a hole 51 and functions to provide an additional amount of resiliency in the lower shank portion, thereby further preventing "slapping" or "chattering" when the tool holder 50 is drawn across the surface of the work being machined. As shown in Fig. 4 the rear portion 48 is bulkier and more sharply rounded than the corresponding surface 21 of the tool 10. It has been found that the configuration of portion 48 assists in providing resiliency when the tool is used on lighter machines. However, the embodiment shown in Fig. 4 and having the cut-out slot 49 is not to be limited to a tool having the "humped" or sharply rounded rear portion.

A cutting tool constructed according to my invention has several advantages over conventional tools. Importantly shopwise is the fact that the readily changeable tool bit 30 may have a cutting edge 40 which is wider than the width of the tool holder, per se. Thus the tool may be used to cut slots deeper than the distance between surfaces 41 and 34. Also important is the fact that the tool bit 30 is readily inserted in the insert notch 18 with only a wrench being used to tighten bolt 26. Of great importance is the fact that the cutting thrust resulting from the contact of the edge 40 against the work being machined is transmitted toward the front of the tool holder, thus reducing the possibility of tool "chatter" or deviation, regardless of how deep a cut the operator chooses to make. Stated another way, the location of the cutting edge 40 behind the trailing edge 20 of the upper shank results in the tool being "pulled" rather than "pushed" across the work, which in combination with surfaces 33 and 37 of the insert notch, results in a tightening force being applied to hold the tool bit in the holder, and this tightening force increases as the cutting thrust of the tool bit against the work surface increases. Likewise, the use of the tool to cut on a radius only increases the degree of tightness by which the tool is held in the holder. It has been found that, once the edge of the cutting tool is engaged against a work surface, even though the bolt 26 is removed, the tool continues to operate satisfactorily until the end of the pass is reached. The cut-out slot in the embodiment shown in Fig. 4 has been found to lessen still further the tendency to "chatter" when the improved tool holder is used on a shaper or slotter.

It is thus apparent that tools according to my invention represent an important advancement in the machining art. Such tools are capable of certain modifications and changes which would be within the scope of the invention, and therefore the subjoined claim is intended to cover all such changes and modifications as lie within the true spirit and scope of the invention.

What is claimed is:

A metal cutting tool comprising, an upper shank portion adapted to be held at substantially a right angle to the direction of a cutting thrust, a lower shank portion offset rearwardly of the upper shank, a tool bit insert notch in the underside of said lower shank behind the trailing edge of said upper shank, said insert notch having a front wall at substantially a right angle to the direction of the cutting thrust, and a rear wall inclined rearwardly downward relative to said front wall, a tool bit having front and rear surfaces complementary with said insert notch, and a tool bit holding means depending through said lower shank portion into said insert notch at substantially a right angle to the direction of the cutting thrust.

References Cited in the file of this patent

UNITED STATES PATENTS

| | | |
|---|---|---|
| 1,443,752 | Lindmark | Jan. 30, 1923 |
| 1,927,409 | Markstrum | Sept. 19, 1933 |
| 2,037,642 | Scribner | Apr. 14, 1936 |
| 2,062,607 | Reany | Dec. 1, 1936 |
| 2,150,561 | Reany | Mar. 14, 1939 |
| 2,444,621 | Wilson | July 6, 1948 |
| 2,520,655 | Reany | Aug. 29, 1950 |

FOREIGN PATENTS

| | | |
|---|---|---|
| 38,852 | Sweden | May 19, 1915 |